G. A. LUTZ.
CONDUIT FOR ELECTRIC CONDUCTORS.
APPLICATION FILED DEC. 18, 1908.
948,865.
Patented Feb. 8, 1910.
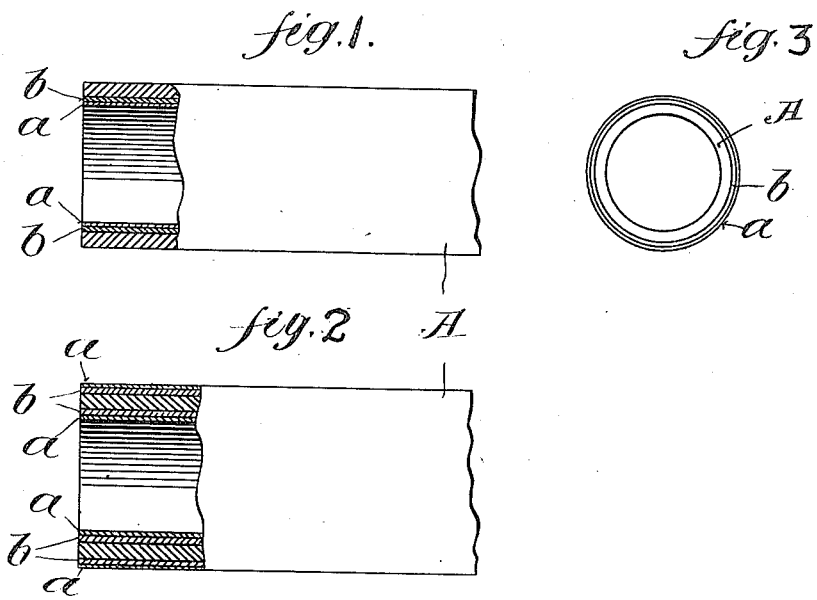
Witnesses:
Inventor
George A. Lutz
By his Attorney
P. F. Bourne

UNITED STATES PATENT OFFICE.

GEORGE A. LUTZ, OF PLAINFIELD, NEW JERSEY, ASSIGNOR TO AMERICAN CIRCULAR LOOM COMPANY, OF PORTLAND, MAINE, A CORPORATION OF MAINE.

CONDUIT FOR ELECTRIC CONDUCTORS.

948,865.  Specification of Letters Patent.  Patented Feb. 8, 1910.

Application filed December 18, 1908. Serial No. 468,112.

*To all whom it may concern:*

Be it known that I, GEORGE A. LUTZ, a citizen of the United States, and resident of Plainfield, in the county of Union and State of New Jersey, have invented certain new and useful Improvements in Conduits for Electric Conductors, of which the following is a specification.

It is well known that metal conduits adapted to receive electric conductors are liable to become rusted, and it is particularly desirable to protect conduits from rusting which are in the form of pipes or tubes adapted to receive electric conductors. Furthermore, conduits comprising metal pipes or tubes used to contain and protect electric conductors present considerable resistance to the pulling of the conductors through the same, particularly when the conduits are of considerable length between outlets, and also where the conductors have to be pulled through elbows or bends in the line of the conduit, which has the tendency to injure the insulation upon such conductors.

I am aware that conduits formed of pipes or tubes have been coated either on the exterior or interior surfaces, or both, with an insulating compound to prevent rusting, and that such pipes or tubes have also been coated with electro deposit of metal, such as zinc, and also that galvanized pipes or tubes ave been provided upon the galvanized surface with an insulating compound. Such insulating compounds are more or less liable to crack or peel off or to be abraded when conductors are pulled through the conduits or when the conduits are handled, thereby exposing the surface of the metal of the conduit, whereby rusting of the metal at such exposed place or places may occur.

The object of my invention is to protect conduits from rusting, and to maintain the conductivity of the metal conduit, and also to lubricate the surface of the conduit, thereby preventing injury to the protecting coating on the exterior when the conduit is handled, and reducing the friction produced in pulling conductors through the conduit, thereby also reducing the danger of injury to the insulation on the conductor while being pulled through the conduit, and furthermore to provide such a coating within the pipe as will not be injured or abraded by the conductor as it is drawn through the conduit. To these ends I first clean the scale from the surface of the conduit and apply upon the cleaned surface of the latter a metal deposit such as an electro deposit of zinc, and upon such metal deposit I apply a non-abrasive lubricous coating.

In the accompanying drawings I have illustrated a metal pipe or tube provided with my improvements, wherein—

Figure 1 is a partly sectional view of a pipe having the coatings on the interior; Fig. 2 is an end view of a pipe having the coatings on the exterior; and Fig. 3 is a partly sectional view of a pipe having the coatings on the exterior and the interior.

In carrying out my invention I first clean the surface of the pipe or tube A, as by pickling, scouring, or in any other wellknown manner, to remove scale and other foreign matter from such surface, and then coat one or both of said surfaces with a metal deposit such as zinc, either by electro plating such surface or surfaces, or by other wellknown galvanizing or other processes as at $b$, and I then apply a non-abrasive lubricous coating $a$ upon such metal deposit. Such coating or lining comprises graphite which may be applied by means of a suitable brush, the graphite being suitably prepared for such purpose as by mixing ground, flake or comminuted graphite with any suitable fluid, oil or other material to produce a paste or fluid-like substance containing graphite. Such graphite coating or lining is capable of being thoroughly and closely applied to the metal deposit on the pipe or tube, and will enter any crevices or hollows in such deposit and protect the same, and such coating affords a lubricating or somewhat lubricous or slippery surface on or in the pipe or tube, whereby a conductor may be more readily pulled through the pipe or tube owing to the reduction of friction, hence the insulation on the conductor will not be injured when pulled along such lubricous surface, and the graphite coating will not be injured by pulling a conductor through the pipe or tube as such coating is non-abrasive in that it will not crack or peel off when the conductor is pulled through the pipe or tube, or when the latter is bent, and will not injure such insulation as the conductor is pulled through the pipe or tube, and when the pipe or tube is handled, slid along a floor or the like, or transported, the exterior lubricous coating will not be cracked or peeled off.

The graphite on such surface also constitutes a conductive coating on or in the pipe. While the electro plating of such surface or surfaces of the pipe or tube, such as galvanizing the same, is intended to prevent rusting of such surface or surfaces, there are liable to be places or spots not covered or only partially covered by the electro plating or metal deposit, where rusting can take place, but the graphite coating applied upon the plated surface or surfaces will cover or coat such places or spots, and protect the same as well as further protecting the remainder of the plated surface or surfaces, while at the same time providing a non-abrasive conductive and lubricating coating, as before explained.

The non-abrasive lubricous conductive coating $a$ may be applied very thinly upon the metal deposit on or in the pipe, and when so applied upon the inner metal deposit does not appreciably decrease the internal diameter of the pipe, thereby further decreasing the objections incident to enamel and other insulation on the interior of pipes, which are necessarily relatively thick, for conductors that are properly adapted to be pulled through such conduits frequently, by being bent or kinked, engage such enamel or insulation and injure the same, and also peel off enamel or insulation and expose the pipe as well as increasing the work of pulling the conductors through by reason of increased friction.

A further important feature of my invention resides in the fact that by having the surface of the pipe thoroughly cleaned from scale before the metal deposit is applied thereto, there is no danger of the coating $a$ being accidentally dislodged from the pipe by scale being removed.

In Fig. 1 the metal plating $b$ is shown deposited upon the inner surface of pipe A and the non-abrasive lubricating conductive coating or graphite $a$ upon the electro deposit; in Fig. 2 the metal plating $b$ is upon the exterior of the pipe and the graphite coating $a$ is upon the plating $b$, while in Fig. 3 the metal plating $b$ is upon both the interior and the exterior surfaces of the pipe, and the graphite coating $a$ is upon both metal platings $b$.

Having now described my invention what I claim is:

1. A new article of commerce comprising a metal conduit having a metal deposit upon its surface and a non-abrasive lubricous coating upon the metal deposit to prevent rusting of the conduit through the pores of said deposit and provide a slippery surface.

2. A new article of commerce comprising a metal conduit having a metal deposit upon its inner surface, and a non-abrasive lubricous coating upon the metal deposit to prevent rusting of the conduit through the pores of said deposit and provide a slippery surface.

3. A new article of commerce comprising a metal conduit having an electrodeposit upon its inner surface, and a non-abrasive lubricous conductive coating upon said deposit to prevent rusting of the conduit through the pores of said deposit and maintain conductivity of the conduit through said deposit.

4. A new article of commerce comprising a metal conduit having an electrodeposit upon its inner surface and a coating comprising graphite upon the electrodeposit to prevent rusting of the conduit through the pores of said deposit and maintain conductivity of the conduit through said deposit.

5. A new article of commerce comprising a metal conduit having a metal deposit upon its inner surface, and a coating comprising graphite upon said metal deposit to prevent rusting of the conduit through the pores of said deposit and maintain conductivity of the conduit through said deposit.

6. A new article of commerce comprising a metal conduit having a metal deposit upon its surface, and a non-abrasive lubricous conductive coating upon the metal deposit to prevent rusting of the conduit through the pores of said deposit and maintain conductivity of said conduit through said deposit.

7. A new article of commerce comprising a metal conduit having a metal deposit upon its surface and a coating comprising graphite upon said metal deposit to prevent rusting of the conduit through the pores of said deposit and maintain conductivity of the conduit through said deposit.

Signed at New York city, in the county of New York, and State of New York, this 17th day of December, A. D. 1908.

GEORGE A. LUTZ.

Witnesses:
T. F. BOURNE,
MARIE F. WAINRIGHT.